Feb. 20, 1945.     O. FREGEOLLE     2,369,780

STITCH REGULATING MECHANISM

Filed April 21, 1944     7 Sheets-Sheet 1

INVENTOR:
OSCAR FREGEOLLE,
ATT'Y.

Feb. 20, 1945. O. FREGEOLLE 2,369,780
STITCH REGULATING MECHANISM
Filed April 21, 1944 7 Sheets-Sheet 2

INVENTOR:
OSCAR FREGEOLLE,
BY
ATT'Y.

Feb. 20, 1945.    O. FREGEOLLE    2,369,780
STITCH REGULATING MECHANISM
Filed April 21, 1944    7 Sheets-Sheet 4

INVENTOR:
OSCAR FREGEOLLE
BY
ATT'Y.

Patented Feb. 20, 1945

2,369,780

UNITED STATES PATENT OFFICE 2,369,780

STITCH REGULATING MECHANISM

Oscar Fregeolle, Central Falls, R. I., assignor to Hemphill Company, Central Falls, R. I., a corporation of Massachusetts Application April 21, 1944, Serial No. 532,082

12 Claims. (Cl. 66—54)

This invention relates to a new and useful improvement in mechanisms for obtaining the different lengths of stitches required for the several parts of a stocking and to a mechanism for fashioning the leg. As hereinafter shown and described, the invention is applied to a circular, independent needle, knitting machine of the Banner type. It can also be used on other machines of the same general character and those in which the cams rotate about the needle cylinder. Nor is it limited to hosiery machines.

The making of various parts of the stocking such as the top, leg, high splice, heel, sole, toe, etc., generally require several different yarns used at different times. These changes of yarns and other considerations involve changes in the length of the stitches or loops. That is to say, in the top the loops are of one length, in the leg they are of another and so on throughout the stocking. These periodic changes of loop length for the various parts have, in the past, been obtained by raising or lowering the cam block upon which the knitting cams are mounted so that the height of the needle hooks in relation to the drawing surface of the sinkers may be varied.

In addition to the periodic alterations of loop length characteristic of the different parts of the stocking, it is sometimes desirable to vary the loop length within one or more of these parts, particularly the leg, to shape or fashion it to a suitable outline. A device for carrying out these objects in relation to the main cam block forms the subject matter of Patent #2,135,185. In certain types of knitting it is essential or, at least, highly desirable, to vary the loop length not only at the main but also at the auxiliary cam block as well and also to make the shaping or fashioning adjustments at both cam blocks. This could be done merely by duplicating the mechanisms of the patent referred to above but this would involve unnecessary expense and duplication of parts and would create a difficult problem to find the necessary space for the additional mechanism. The object of this invention is to provide the desired periodic and fashioning adjustments for both the main and auxiliary cam blocks from a single fashioning bracket operated by a single fashioning unit.

The form of the invention selected for description herein is shown in the drawings of which.

Figures 1, 13, 14:
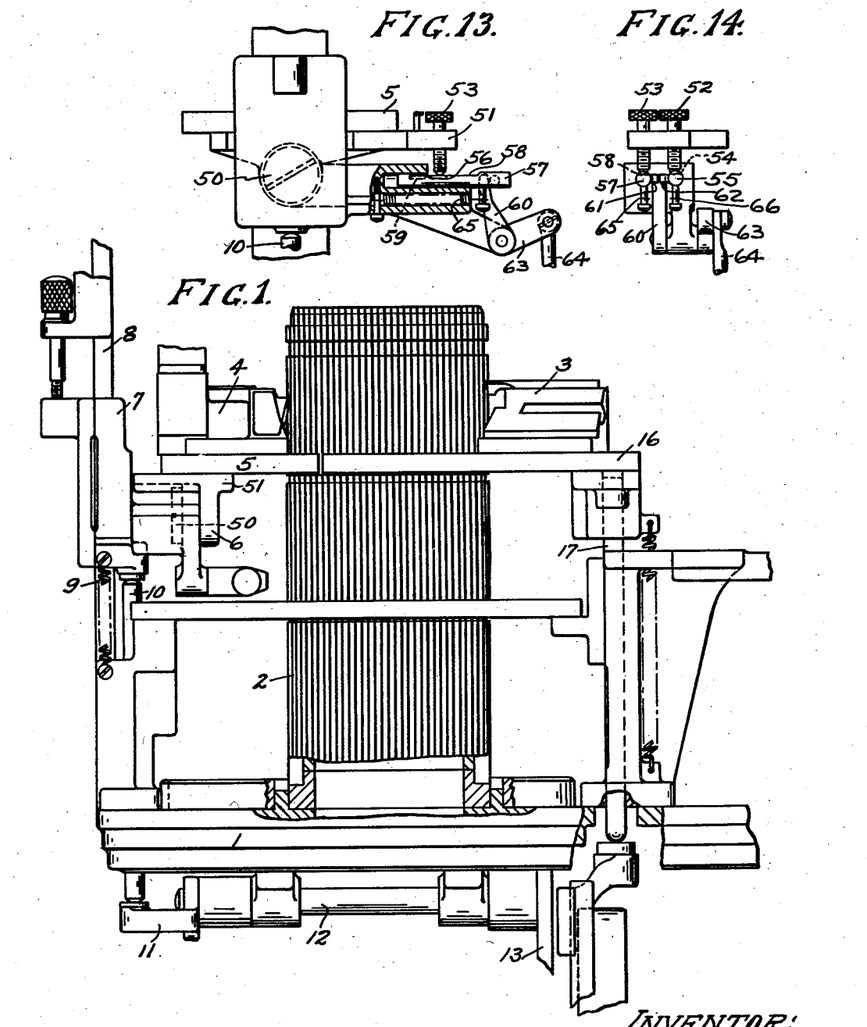
Fig. 1 is a front elevation of part of a circular, independent needle, knitting machine of the Banner type showing, among other things, the cylinder, the main and auxiliary cam blocks and part of the mechanism employed to alter the respective heights of these cam blocks for variations in loop length.
Figs. 13 and 14 illustrate an auxiliary device whereby the relative heights of the two knitting cams of one or both of the cam blocks may be altered without affecting the operation of the mechanisms disclosed in the other figures.
Figure 5:
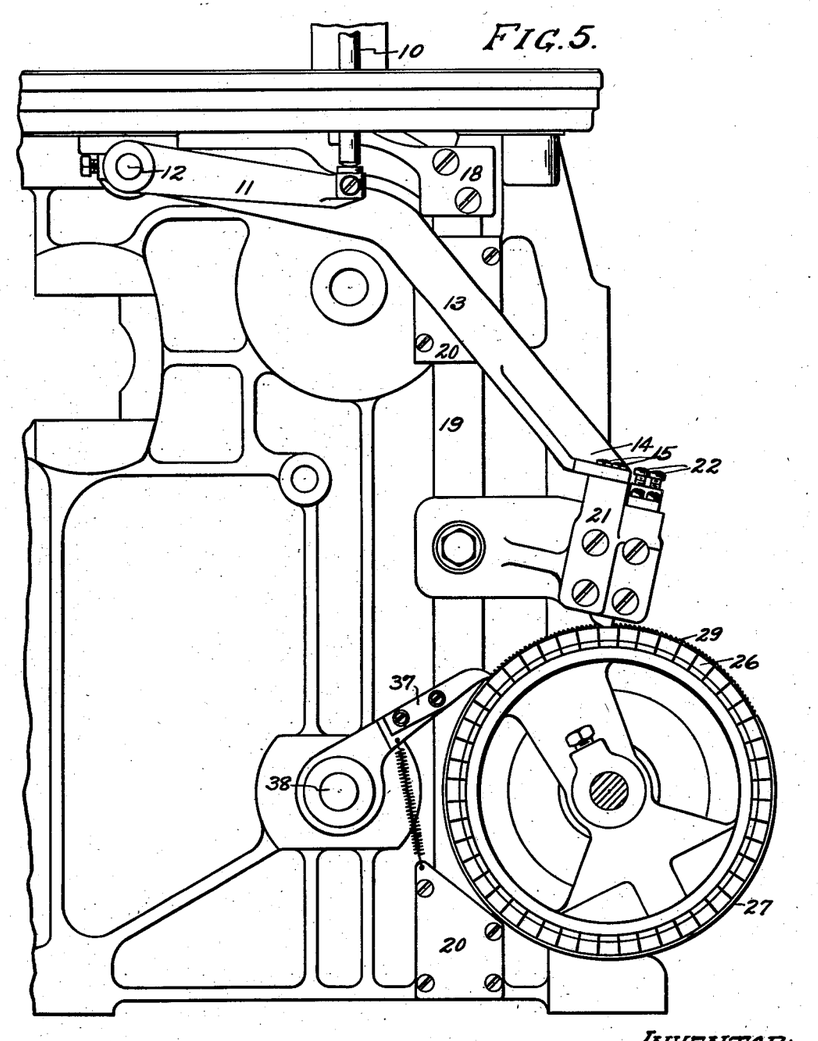
Fig. 5 is a side elevation corresponding generally to Fig. 2.

As shown in Fig. 1, the knitting machine includes the usual base 1, rotating cylinder 2, main cam block 3 and auxiliary cam block 4. The auxiliary cam block is mounted on plate 5 attached to a support 6 which is in turn mounted on a bracket 7 vertically slidably upon a guide 8. Normally, bracket 7 and, consequently, cam block 4 is urged downwardly by a spring 9. The underside of bracket 7 engages the upper end of a rod 10, the lower end of which rests upon a lever 11 attached to the end of a rockable shaft 12. To the other end of this shaft is attached lever 13 best shown in Fig. 5 adapted to rock the shaft, the other end 14 of which is provided with equally spaced downwardly projecting screws 15, shown in Fig. 3 of the drawings as two rows of six screws each, one row being offset from the other.

Figures 2, 3, 4:
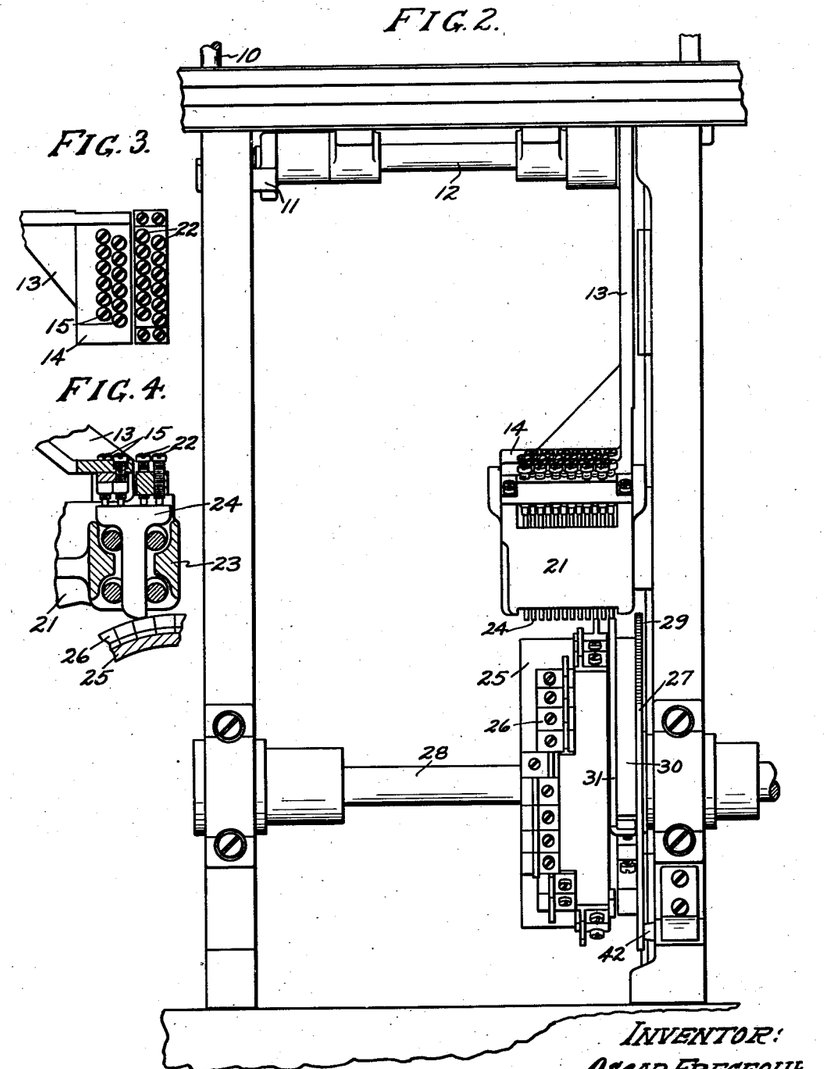
Fig. 2 is a front elevation of the remainder of the mechanism associated with that of Fig. 1.
Figs. 3 and 4 are detailed views of parts of the mechanism of Fig. 2.

Main cam block 3 is similarly mounted upon a support 16 forming the upper end of slide 17 which is adapted to slide vertically through suitable guides. Its lower end rests upon a bracket 18 on the upper end of another slide 19 which is vertically slidable in guides 20. Attached to slide 18 is a fashion bracket 21. This bracket also is provided with two rows of equally spaced downwardly projecting screws 22 as shown in Fig. 3, six to the row, and staggered in the same way as screws 15. In addition, the respective rows 22 of screws of fashion bracket 21 are in cross alignment with the corresponding rows of screws 15 on the end of lever 13.

The internal construction of fashion bracket 21 is shown in Figs. 2 and 4. It consists of a housing 23 opened at the top and bottom within which are mounted in parallel alignment as many vertically slidable plungers 24 as there are screws 15 or 22. Since there are twelve screws in each of these sets in the particular device selected for description, twelve plungers 24 are shown. As shown in Fig. 4, each of these plungers is in alignment with corresponding screws 15 and 22. Also as shown in Fig. 4 the lower ends of screws 15 and 22 project downwardly so as to rest upon the plungers 24. The lower end of each plunger 24 projects below the bottom of housing 23 as shown in Figs. 2 and 4.

Beneath the fashion bracket 21 is a pattern drum 25 which may be of the usual type having, in the present example, provision for eleven sectional and interchangeable cams 26 of equal height positioned so as to engage respectively the eleven left plungers 24 of fashion bracket 21. These cams are arranged about the drum 25 so that the rear end of one is laterally opposite the front end of another in the order, in which they are used, so that together they form a complete, though broken, circle about the drum 25 and will raise first one plunger 24 and then another from its low inoperative position to a definite height. Since the only support for fashion bracket 21 is the plungers 24 through screws 22 it will be evident that the vertical position of bracket 21 and, consequently, of main cam block 3 at any time will be determined by the adjustment of the screw 22 associated with the particular plunger 24 which is riding upon a cam 26. In this way, eleven separate adjustments of the stitch cams at main cam block 3 are provided by the eleven screws 22 and the corresponding eleven plungers 24 shown at the left on fashion bracket 21 in Fig. 2.

Screws 15 mounted in the lower end 14 of lever 13 as shown in Figs. 2, 3 and 4 are also similarly supported by the same plungers 24. Also they are similarly adjustable. The adjustment of a screw 15 determines the position of arm 13 when the corresponding plunger is riding upon its cam and, consequently, the position of cam block 4. The amount by which cam block 4 is altered as one plunger after another becomes operative depends upon the difference in the settings of screws 15.

In this way, a single pattern drum having interchangeable cams and a single set of plungers are utilized to bring about adjustments in the heights of both the main and auxiliary cam blocks. Although these adjustments are obtained from a single controlling source each is wholly independent of the other because of the interposition of adjusting screws 15 and 22. The position of either cam block may be altered at will without affecting the other or both may be simultaneously adjusted to the same or different degrees. Only as many cams as are required for the number of different stitch lengths need be used on drum 25 provided they together form a complete circle so that there will always be a plunger 24 in action to support bracket 21 and lever 3 and, consequently, the cam blocks. The length of each cam will, of course, be determined by the length of fabric requiring each particular stitch length and can be lengthened or shortened easily by adding or subtracting cam sections.

The timing and duration of each adjustment is determined by the position upon the pattern drum 25 of the cam 26 involved and its length in relation to the rate of rotation of the drum. Customarily, the several rows of cams on pattern drum 25 are arranged in a progressive, orderly, manner to make it easy to remember which row produces the adjustment of stitch length for each part of the stocking so that any desired alteration in any particular part can be easily made.

The number of cam block adjustments which can be made by this device is limited by the size of pattern drum 25 and the timing of its rotation with respect to the progress of the knitting. Usually drum 25 is moved intermittently by a ratchet device of well known characteristics and makes one revolution during the knitting of a stocking.

Figure 6:
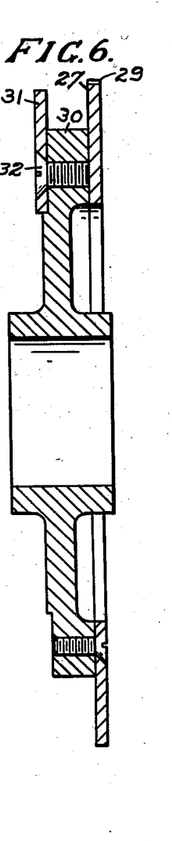
Fig. 6 is a sectional view of the mechanism for fashioning the leg.
Figure 7:
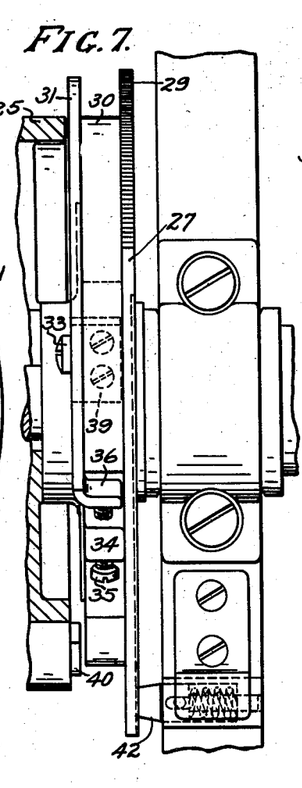
Figs. 7 and 8 are further views of details of this fashioning mechanism.

Because the number of possible adjustments is limited, they are generally confined to the periodic stitch variations required for the different parts of the stocking, i. e., one setting for the top, another for the ring top, another for the leg, etc. For half-hose and other similar stockings these adjustments are usually sufficient since no fashioning of the leg is required. However, they are not sufficient for fine quality sheer ladies' hosiery. For this the size of the leg should be altered frequently and progressively. This is accomplished by a supplementary stitch regulating device operating independently of but in harmony with that already described. This consists of a disk 27 rotatably mounted upon shaft 28 to which pattern drum 25 is fixed. A section of the edge of disk 27 is provided with ratchet teeth 29, the length of this section depending upon the length of fabric to be shaped or fashioned. Fixed to the side of disk hub 30 is a cam 31 the mounting preferably consisting of a pivot 32 at one end and a slot and screw adjustment 33 adjacent the other end. The hub 30 of disk 27 is provided with a lug 34 through which is threaded an adjusting screw 35 adapted to engage the end 36 of cam 31. By this screw the height of cam 31 can be adjusted when screw 33 is loosened and maintained by tightening screw 33. This cam 31 provides a camming surface of progressively increasing height from one end to the other.

When in operation for regulating stitch length, disk 27 is ratcheted around by a pawl 37 mounted upon rock shaft 38 which is rocked by the quadrant of the knitting machine. This ratcheting will continue as long as there are ratchet teeth 29 on the edge of the disk to be engaged by pawl 37. When the last tooth is reached the pawl can rotate the disk no further but simply continues to rock back and forth without effect. Since the ratcheting of disk 27 by pawl 37 occurs during the knitting of the leg while the pattern drum 25 is stationary it is wholly independent of the pattern drum. However, when another stocking is knit it is essential that disk 27 shall start to operate at the same time or, in other words, at the same point in knitting as it did before. Therefore, it must be retimed in relation to pattern drum 25. This is accomplished by fixing to disk 27 a stop 39 adapted to engage with a similar stop 40 on the adjacent pattern drum 25. These stops are so positioned that the movement of pattern drum 25 subsequent to the operation of disk 27 will cause them to engage whereupon the pattern drum will carry disk 27 along with it until both are in the correct position to function again at the proper point of another stocking. During this retiming operation pattern drum 25 continues to perform its usual functions. Disk 27 is idle, pawl 37 simply riding upon the toothless part of the edge as the disk is turned by the pattern drum.

Figures 8, 9:
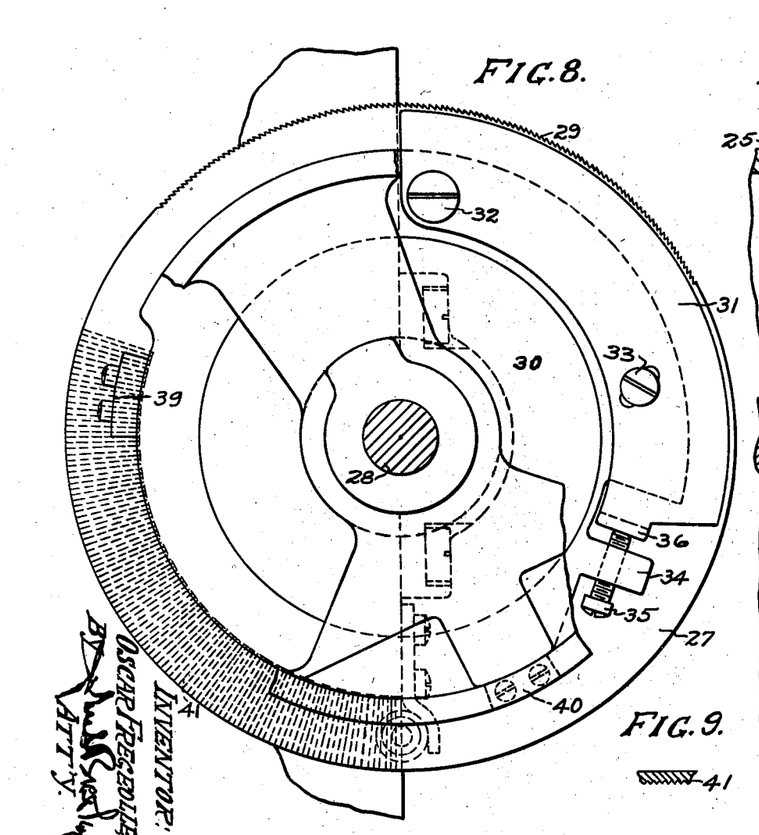
Fig. 9 is a sectional view of a fragment of Fig. 8.

To insure that disk 25 is accurately ratcheted by pawl 37 it may be provided with a series of radial grooves 41 (Figs. 8 and 9) engageable by a spring pressed detent 42 the grooves 41 corresponding in spacing and extent to the ratchet teeth 29.

Disk 27 is positioned alongside pattern drum 25 so that its cam 31 is below the 12th or right plunger 24 of the fashion bracket. Cam 31 on disk 27 and ratchet teeth 29 are so positioned that the cam will engage this plunger during the knitting of the leg to progressively vary the height of the stitch cams in relation to the needles. When the area to be fashioned is completed, cam 31 will pass from under the plunger which will remain inactive until it is caused to repeat its performance during the knitting of the next stocking.

In its essential aspects this fashioning device differs in function from bracket 21 only in that the plunger operated upon by cam 31 is raised progressively to different heights to produce a corresponding progressive variation in the position of the stitch cams.

Figure 10:
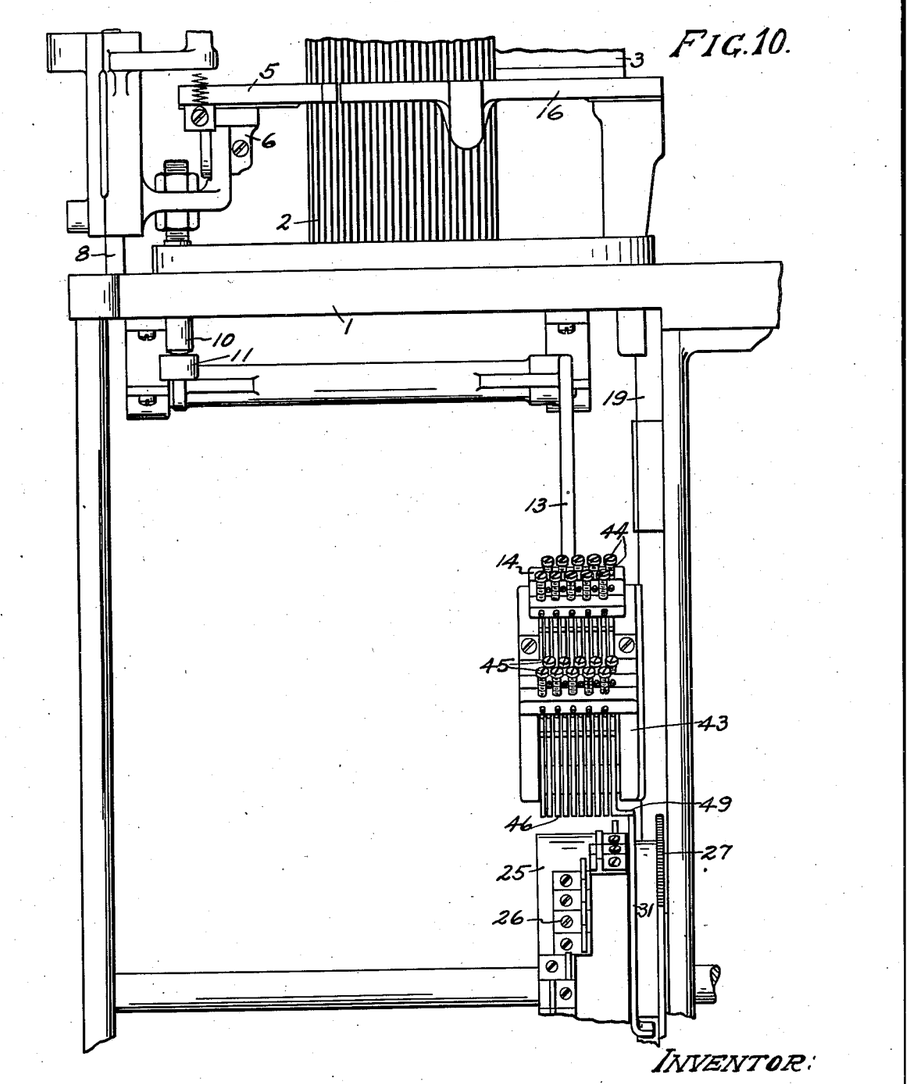
Fig. 10 is a front elevation of another form of the invention.
Figure 11:
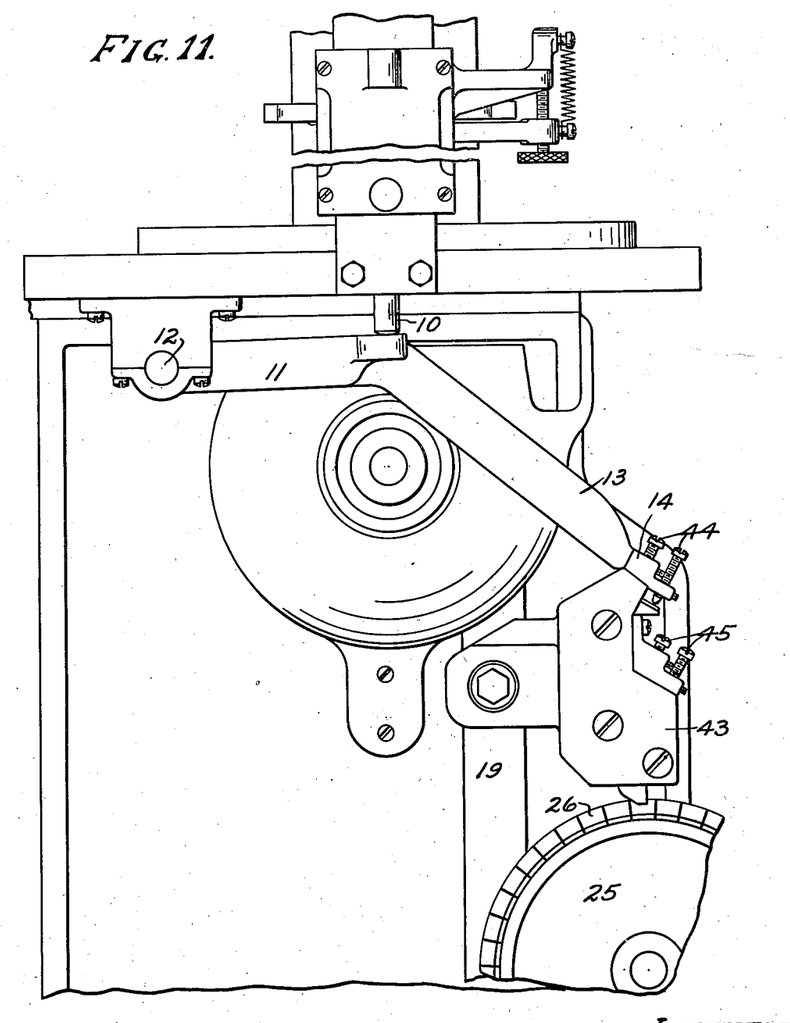
Fig. 11 is a side elevation of this modified form.
Figure 12:
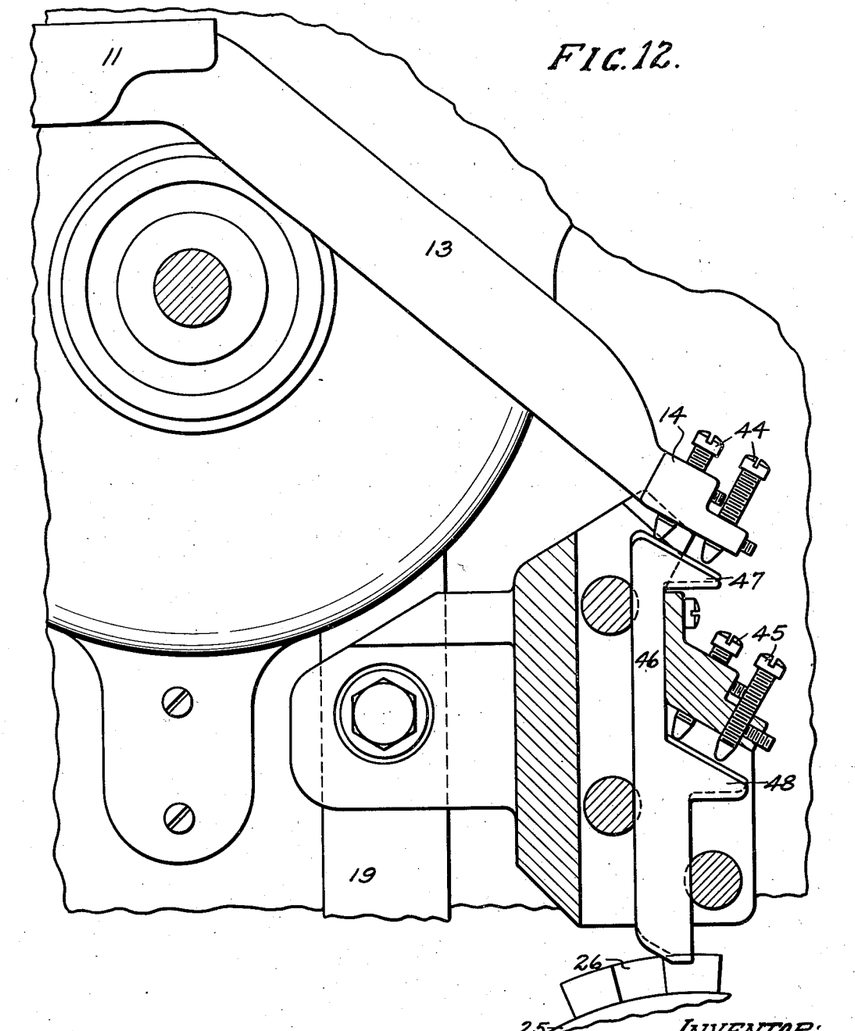
Fig. 12 is an enlarged view of a part of Fig. 10.

A modified form of the fashion bracket of this invention is shown in Figs. 10, 11 and 12. As in the form previously described, the fashion bracket housing 43 is attached to the rod 19 through which the height of the main cam block is controlled from the pattern drum.

The auxiliary cam block is also controlled through the same levers 11 and 13 as before. The end 14 of lever 13 is provided with screws 44 in two parallel staggered rows of five each, in this instance. Fashion bracket housing 43 is also equipped with two parallel staggered rows of adjusting screws 45, five in each row, the two sets of screws 44 and 45 being positioned as before so that each screw of each set is in cross alignment with a screw of the other set.

Housing 43 is provided with ten plungers 46 in parallel arrangement and alignment with the respective adjusting screws 44 and 45. Since, in this form, adjusting screws 44 are above adjusting screws 45, the plungers instead of being T shaped as in the form of the invention first described, are provided with two heads 47 and 48 adapted to engage with screws 44 and 45 respectively. The plungers 46 are slidable in a vertical plane under the control of cams 26 on pattern drum 25 in exactly the same manner as heretofore described.

As in the other form, the adjustment of either the main or auxiliary cam block or both is controlled from pattern drum 25 through plungers 46. In this instance, since only ten plungers are shown, the pattern drum may be provided with facilities for ten corresponding rows of cams. All ten of the plungers are controlled by the pattern wheel cams. In addition, the tenth or right plunger (Fig. 10) is provided with a rectangular foot 49 so that it may also be engaged and controlled by the fashioning disk 27 already described.

In addition to the regulation of stitch length by vertical adjustment of the cam blocks as heretofore described, it is also desirable to be able to independently adjust the relative heights of the two stitch cams. For example, in rotary knitting when two yarns are separately fed and separately knit at a single cam block, knitting is done under both stitch cams. Since the object of two feed knitting is usually plain fabric, not only should the two yarns be identical but the stitches of both yarns should be exactly the same. Stitch cams of equal height do not always produce this result and it is necessary to raise one with respect to the other irrespective of the required variations in vertical adjustment of both stitch cams. This is made possible by mounting the cam block upon a pivot as at 50 in Fig. 13. By swinging the cam block around the pivot 50, one stitch cam is raised and the other lowered. In this way, the stitches knit under both stitch cams can be equalized.

The same kind of adjustment of the relative heights of the stitch cams is equally desirable for reciprocatory knitting since various factors in addition to the actual positions of the cams may affect the stitches. Since the change from rotary to reciprocatory knitting is automatic in all modern machines and since the adjustment of the stitch cams is not likely to be the same for reciprocatory as for rotary knitting, automatic means for shifting from one adjustment to the other is essential.

A cam block mounting of this character and means for operating it to secure a desired relative adjustment of the two stitch cams for both rotary and reciprocatory knitting is disclosed in co-pending application #526,028, filed March 11, 1944. The device shown in Figs. 13 and 14 of the present application is essentially the same as that disclosed in the co-pending application with the exception that the automatic means for swinging the cam block to the desired positions for rotary and reciprocatory knitting is different in form although the same in principle.

As in the co-pending application, the pivoted mount 51 for the cam block is provided with two adjusting screws 52 and 53 threaded through mount 51. The lower end of each of these screws is engageable with a cam having a high and a low surface so positioned that when the high surface of one cam is beneath one screw, the low surface of the other cam is beneath and separated for the other screw. In this way, one adjustment of the cam block can be made manually by means of screw 52 and another by screw 53. Because the camming surfaces of the two cams are staggered, one adjustment can be used during rotary knitting and the other during reciprocatory knitting simply by moving the cams simultaneously so that the high and low surfaces are shifted.

For example, assuming that screw 52 is used to adjust the cam block for rotary knitting the high part 54 of its cam 55 should be under screw 52 as shown in Fig. 14. The corresponding low part 56 of the other cam 57 will be under screw 53 as shown in Figs. 13 and 14 so that this adjusting screw is out of action. Assuming that screw 53 has been adjusted for the stitch cam requirements of reciprocatory knitting it is brought into action by shifting cams 55 and 57 so that the high part 58 of cam 57 is moved under screw 53 thus making the adjustment of this screw effective and the low part 59 of cam 55 simultaneously moved under screw 52 putting this adjusting screw out of action.

In the form shown in Figs. 13 and 14 the two cams 55 and 57 are in the nature of two separate suitably guided slides provided with high and low cam surfaces 54 and 59 and 58 and 56 respectively in the staggered positions already referred to so that the high part of one cam and the low part of the other cam are simultaneously under their respective adjusting screws. The mechanism shown for automatically shifting cams 55 and 57 from one position to the other consists of a bell crank, the upper arm 60 of which is engageable with studs 61 and 62 projecting laterally from cams 55 and 57 respectively. The other arm 63 of the bell crank is pivotally attached to a rod 64 which represents the operating connections to a suitable cam drum or other timing device by which the bell crank is operated to shift the cams at the desired times. As shown the bell crank shifts the cams to the right, the reverse shifting being effected by springs 65 and 66 when the bell crank is rocked to the left.

Obviously, the pivotal relative adjustment of the heights of the two stitch cams on cam block 4 just described complements the vertical adjustment of the entire cam block previously described to supply complete automatic control of the heights of the two stitch cams and, consequently, of the length of the stitches knitted at each.

Although in the drawings only cam block 4 is shown upon a pivoted mount with the automatic means for varying the relative heights of the two stitch cams it may, if desired, be applied to the main cam block 3 also. Although cams 55 and 57 are shown as two separate rod-like parts they may, of course, be combined into a unitary structure or given any other desired form.

The rotation of pattern drum 25 has been said to be intermittent. The meaning of this is that the drum is stationary most of the time, it being moved only to the necessary extent required to bring the various cams into operation at the desired time. Since other timing mechanisms are usually driven by the same shaft as drum 25 under the control of a pattern chain the timing and rate or rotation of drum 25 must, practically speaking, be accommodated to that required for the others. For this reason, a single rotation per stocking of all of the timing mechanisms, including drum 25 upon this shaft has been found the most convenient and practical, the duration of each stitch length being determined by the length of each cam 26. This is fully described in Patent #2,135,185 already referred to.

It is possible, of course, to operate a drum such as 25 independently. For example, a ratchet can be provided for drum 25 with double the number of teeth and the pawl so arranged as to engage one tooth at a time. The drum would then rotate only one half a revolution per stocking instead of a complete revolution. By confining the stitch regulating cams to one half of the circumference of the drum and duplicating them upon the other half, the same result would be obtained, each half of the drum controlling the stitch length of an individual stocking.

Although the cam blocks have been referred to as "main" and "auxiliary" these terms are meant to define any two or more separate knitting cams having separate amounts.

I claim:

1. In a circular, independent needle, knitting machine having main and auxiliary cam blocks each mounted upon a vertically slidable mount, stitch regulating mechanism including separate means associated with each mount for determining the operating height of each block, a support beneath said last mentioned means and automatic means for moving said support into and out of engagement with said last mentioned means at any desired time during knitting.

2. In a circular, independent needle, knitting machine having a main and auxiliary cam block each mounted on a vertically slidable mount, stitch length regulating mechanism including means associated with each mount for independently determining its operating height, a common support for both height varying means and automatic means for moving said support into and out of contact therewith at any desired time during knitting.

3. In a circular, independent needle, knitting machine having main and auxiliary cam blocks each mounted upon a vertically slidable mount, stitch regulating mechanism including a plurality of adjustable means associated with each mount for independently determining the operating height thereof, a plurality of supports each engageable with one of the adjustable means of each mount and means for moving any one of said supports into engagement with the corresponding adjustable means at any desired time during the knitting.

4. In a circular, independent needle, knitting machine having main auxiliary cam blocks each mounted upon a vertically slidable mount, stitch length regulating mechanism including a plurality of adjustable means associated with each mount for independently determining the operating height thereof, a plurality of supports each engageable with one of the adjustable means of each mount, said supports being, normally, in non-engaging position and means for moving each of said supports into engagement with the corresponding adjustable means and for maintaining it in that position for a predetermined time and for simultaneously permitting all of the other supports to assume non-engaging positions.

5. In a circular, independent needle, knitting machine having main and auxiliary cam blocks each mounted on a vertically slidable mount, stitch length regulating mechanism including a plurality of adjustable means associated with each mount for determining the operating height thereof, a plurality of supports each engageable with one of the adjusting means of each mount and means for selectively moving all of said supports from an inoperative to the same operative position at which each will engage with the corresponding adjustable means of each mount.

6. In a circular, independent needle, knitting machine having main and auxiliary cam blocks each mounted upon a vertically slidable mount, stitch length regulating mechanism including a fashioning bracket on one mount, a plurality of adjustable means on said bracket for determining the operating height of said mount, a support for each of said adjustable means, means for moving each support into and out of engagement with the corresponding adjustable means, similar adjustable means associated with the mount of the other cam block, and similarly engageable with said supports.

7. A circular, independent needle, knitting machine according to claim 1 which also includes independently operated means for progressively varying the operating height of both cam blocks when the other stitch length regulating mechanism is inoperative.

8. In a circular, independent needle, knitting machine having a main and auxiliary cam block each mounted on a vertically slidable mount, stitch length regulating mechanism including a plurality of adjustable means associated with each mount for determining the effective height thereof, a plurality of vertically movable supports each engageable with one of the adjustable means of each mount and means for moving any one of said supports from a low inoperative position to an operative position of a definite height at which said support so moved will engage with the corresponding adjustable means.

9. A circular, independent needle, knitting machine according to claim 3 in which at least one cam block is also swingable about a pivot, and means for automatically swinging said block about said pivot independently of its vertical adjustment.

10. A circular, independent needle, knitting machine according to claim 3 in which at least one cam block is also swingable about a pivot, and means for automatically swinging said block about said pivot independently of its vertical adjustment said last mentioned means consisting of a pair of slidable cams so arranged as to be alternately operative to swing said block about its pivot in opposite directions.

11. A circular, independent needle, knitting machine according to claim 3 in which at least one cam block is also swingable about a pivot, and means for automatically swinging said block about said pivot independently of its vertical adjustment said last mentioned means consisting of a pair of slidable cams so arranged as to be alternately operative to swing said block about its pivot in opposite directions and automatic means for so operating said cams.

12. In a circular, independent needle, knitting machine having vertically adjustable main and auxiliary cam blocks, the combination of means for independently adjusting vertically the operating height of both blocks at any desired time, a common controlling device for effecting the said adjustment of said blocks and means for swinging at least one of said blocks about a pivot to alter the relative heights of stitch cams thereon independently of the other adjusting means.

OSCAR FREGEOLLE.